US010080137B2

(12) United States Patent
Rolls, IV

(10) Patent No.: US 10,080,137 B2
(45) Date of Patent: *Sep. 18, 2018

(54) SYSTEM AND METHOD FOR AUTHENTICATING LOCAL CPE

(71) Applicant: CHARTER COMMUNICATIONS OPERATING, LLC, St. Louis, MO (US)

(72) Inventor: James A. Rolls, IV, Cherry Hills Village, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,170

(22) Filed: Apr. 14, 2017

(65) Prior Publication Data

US 2017/0230827 A1 Aug. 10, 2017

Related U.S. Application Data

(63) Continuation of application No. 14/069,735, filed on Nov. 1, 2013, now Pat. No. 9,628,457.

(51) Int. Cl.
*G06F 7/04* (2006.01)
*H04W 12/06* (2009.01)
*H04L 29/06* (2006.01)
*H04W 84/10* (2009.01)

(52) U.S. Cl.
CPC .............. *H04W 12/06* (2013.01); *H04L 63/08* (2013.01); *H04W 84/105* (2013.01)

(58) Field of Classification Search
CPC ...... H04W 12/06; H04W 84/105; H04L 63/08
See application file for complete search history.

(56) References Cited

U.S. PATENT DOCUMENTS

| | | | |
|---|---|---|---|
| 7,322,041 B2 | 1/2008 | Bilgic et al. | |
| 7,397,911 B2 | 7/2008 | Shen et al. | |
| 7,865,727 B2 | 1/2011 | Zeng et al. | |
| 8,127,022 B2 | 2/2012 | Jones et al. | |
| 8,181,262 B2 | 5/2012 | Cooper et al. | |
| 8,281,355 B1 | 10/2012 | Weaver | |
| 8,402,498 B2 * | 3/2013 | George | H04N 21/4396 725/106 |

(Continued)

OTHER PUBLICATIONS

International Search Report and Written Opinion of PCT/US2014/063342, dated Feb. 19, 2015, pp. 1-3.

*Primary Examiner* — Techane Gergiso
(74) *Attorney, Agent, or Firm* — Meagher Emanuel Laks Goldberg & Liao, LLP

(57) ABSTRACT

Systems, methods, apparatus and other mechanisms for authenticating wireless customer premises equipment (CPE) at a service location by transmitting an authentication trigger signal via a first communication mechanism associated with the service location toward CPE associated with the service location; monitoring a second communication mechanism associated with the service location to detect therefrom any received authentication trigger response signals; and authenticating only CPE associated with a received authentication trigger response signal, wherein at least one of the first and second communication mechanisms comprises a local infrastructure element.

20 Claims, 4 Drawing Sheets

(56) References Cited

U.S. PATENT DOCUMENTS

| | | | |
|---|---|---|---|
| 8,732,854 B2* | 5/2014 | Cholas | H04L 63/062 705/51 |
| 8,763,097 B2* | 6/2014 | Bhatnagar | G06F 21/35 709/217 |
| 8,955,074 B2 | 2/2015 | Barton | |
| 2005/0053086 A1* | 3/2005 | Mehta | H04L 12/185 370/432 |
| 2005/0261970 A1* | 11/2005 | Vucina | G06Q 20/20 705/16 |
| 2006/0098607 A1* | 5/2006 | Zeng | H04L 45/16 370/338 |
| 2006/0205354 A1* | 9/2006 | Pirzada | H04L 63/0492 455/66.1 |
| 2006/0206709 A1 | 9/2006 | Labrou et al. | |
| 2006/0242285 A1* | 10/2006 | Moriwaki | H04L 67/12 709/223 |
| 2007/0022469 A1* | 1/2007 | Cooper | H04K 1/00 726/3 |
| 2007/0214270 A1 | 9/2007 | Asillis | |
| 2007/0283142 A1 | 12/2007 | Milstein et al. | |
| 2008/0112405 A1 | 5/2008 | Cholas et al. | |
| 2008/0162925 A1* | 7/2008 | Okaya | H04L 9/0844 713/155 |
| 2008/0165283 A1* | 7/2008 | Brandt | H04M 3/42195 348/552 |
| 2008/0168524 A1* | 7/2008 | Wood | H04N 7/17318 725/134 |
| 2008/0244260 A1 | 10/2008 | Feldman et al. | |
| 2010/0217837 A1* | 8/2010 | Ansari | G06Q 30/04 709/218 |
| 2010/0306533 A1 | 12/2010 | Phatak | |
| 2011/0099488 A1* | 4/2011 | Jin | G06F 9/44 715/764 |
| 2011/0154444 A1* | 6/2011 | Sriraghavan | G06F 3/04883 726/4 |
| 2011/0219229 A1* | 9/2011 | Cholas | G06F 21/00 713/168 |
| 2011/0225417 A1 | 9/2011 | Maharajh et al. | |
| 2011/0281609 A1* | 11/2011 | Kuo | H04W 12/06 455/515 |
| 2011/0307514 A1* | 12/2011 | Goodman | G06F 17/30545 707/770 |
| 2012/0093508 A1* | 4/2012 | Baykal | H04L 12/2881 398/58 |
| 2012/0151570 A1* | 6/2012 | Cooppan | H04L 63/0823 726/10 |
| 2012/0166655 A1* | 6/2012 | Maddali | G06F 9/547 709/228 |
| 2012/0173869 A1 | 7/2012 | Stinson et al. | |
| 2012/0284741 A1* | 11/2012 | Shetty | H04H 60/94 725/25 |
| 2012/0284742 A1* | 11/2012 | Sharma | H04N 7/088 725/32 |
| 2013/0173797 A1 | 7/2013 | Poirer et al. | |
| 2013/0179954 A1* | 7/2013 | Bidare | H04L 63/18 726/7 |
| 2013/0282832 A1* | 10/2013 | Bharadhwaj | G06Q 10/10 709/205 |
| 2013/0290707 A1 | 10/2013 | Sinclair | |
| 2013/0326561 A1* | 12/2013 | Pandey | G11B 27/031 725/58 |
| 2013/0340028 A1 | 12/2013 | Rajagopal | |
| 2014/0013363 A1* | 1/2014 | Chang | H04N 7/162 725/62 |
| 2014/0075523 A1 | 3/2014 | Tuomaala | |
| 2014/0096215 A1 | 4/2014 | Hessler | |
| 2014/0189808 A1 | 7/2014 | Mahaffey et al. | |
| 2014/0273963 A1 | 9/2014 | Su et al. | |
| 2014/0281498 A1 | 9/2014 | Bransom et al. | |
| 2015/0156270 A1* | 6/2015 | Teraoka | G06F 13/00 709/219 |

* cited by examiner

SYSTEM AND METHOD FOR AUTHENTICATING LOCAL CPE

FIELD OF THE INVENTION

The invention relates to authenticating customer premises equipment (CPE) and, more particularly but not exclusively, to authenticate CPE at a location in a manner requiring the use of location-specific infrastructure.

BACKGROUND

Services such as voice, data, streaming video and other services are often provided to home and business customers/subscribers by telecom service providers, multichannel video programming distributors (MVPD) and so on. Customer premises equipment (CPE) may include various types of terminal equipment to process received MVPD signals to thereby enable subscribers to view, record, and interact with the services. Among the more common consumer electronics devices are television sets, set-top boxes, cable modems and personal video recorders. The various devices must be authenticated in some manner to ensure that only the CPE associated with the customer/subscriber at a particular location is using the provided services.

Unfortunately, within the context of wireless devices such as wireless routers, wireless set-top boxes or other CPE including wireless modems, it is difficult to ensure that wireless CPE associated with the customer/subscriber is in fact at the particular location for which the services are to be provided. This problem grows more acute with the progression of wireless network technology toward ever greater ranges. Therefore, a problem exists in that CPE authorized for use by a particular customer/subscriber may be used in an unauthorized manner by a nearby neighbor of the authorized customer/subscriber. For example, an authorized customer/subscriber having CPE supporting a long range Wi-Fi (e.g., 802 11.x) or WiMAX network may allow an unauthorized user to access this network. Even if access to the network is restricted to specific authorized devices (e.g., wireless STB registered to authorized customer/subscriber), the authorized customer/subscriber might give or sell an authorized device to an unauthorized user within range of the network.

SUMMARY

Various deficiencies in the prior art are addressed by systems, methods, apparatus and other mechanisms to authenticate CPE at a location in a manner requiring the use of location-specific infrastructure to avoid location-related theft of services.

In particular, various embodiments provide systems, methods, apparatus and other mechanisms for authenticating wireless customer premises equipment (CPE) at a service location by transmitting an authentication trigger signal via a first communication mechanism associated with the service location toward CPE associated with the service location; monitoring a second communication mechanism associated with the service location to detect therefrom any received authentication trigger response signals; and authenticating only CPE associated with a received authentication trigger response signal, wherein at least one of the first and second communication mechanisms comprises a local infrastructure element.

BRIEF DESCRIPTION OF THE DRAWING

The teachings of the present invention can be readily understood by considering the following detailed description in conjunction with the accompanying drawing, in which.

To facilitate understanding, identical reference numerals have been used, where possible, to designate identical elements that are common to the figures.

DESCRIPTION

The invention will be primarily described within the context of systems, methods, apparatus and other mechanisms enabling authentication of CPE at a customer/subscriber location in a manner requiring the use of location-specific infrastructure such as powerline connections, location specific service delivery connections (e.g., telephone lines, fiber-optic connections, cable television coaxial connections) and so on. Further, while the invention will be primarily described within the context of a MVPD delivery network, it will be appreciated by those skilled in the art, the teachings of the various embodiments are also applicable to other broadband services delivery networks, such as passive optical networks (PONs), satellite networks and so on.

Figure 1:
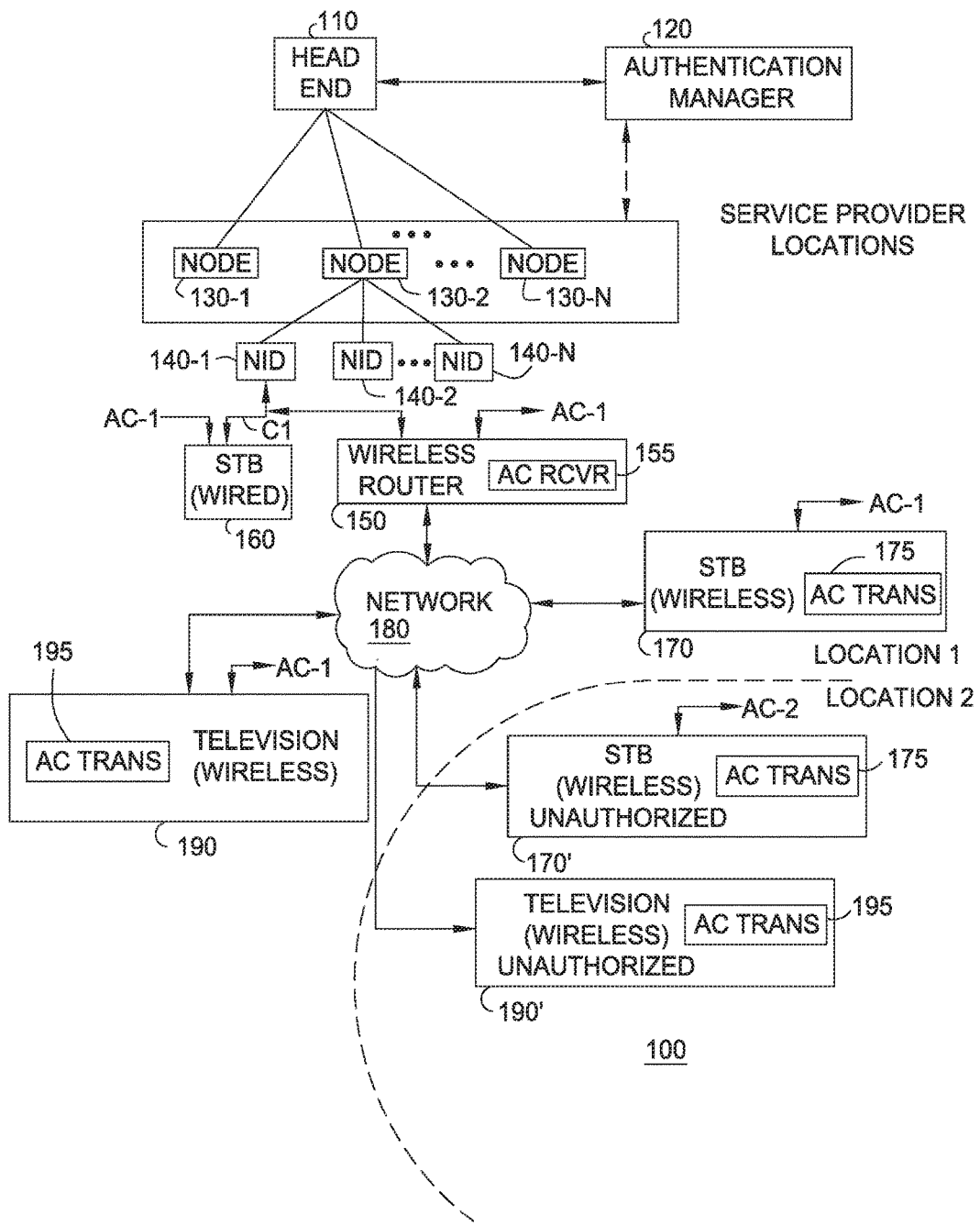
FIG. 1 depicts a high-level block diagram of a system according to one embodiment.

FIG. 1 depicts a simplified block diagram of a broadband services delivery network benefiting from the various embodiments. Specifically, the broadband services delivery network 100 of FIG. 1 as depicted comprises a MVPD distribution/delivery network, though other types of distribution/delivery networks may benefit from the various embodiments.

The broadband services delivery network 100 comprises, illustratively, a head end 110 adapted to communicate with an authentication manager 120 and a plurality of nodes 130-1 through 130-N (collectively nodes 130). In various embodiments, such as in some telecom networks, the head end 110 is implemented using a central office (CO). The various other network elements described herein may also be adapted for particular use within the context of the telecom network embodiments.

The head end 110 may comprise a cable television head end or network server operative to provide broadband services to subscribers/customers, manage subscriber/customer sessions, propagate content toward subscribers/customers, interact with subscriber/customer CPE and the like. The head end 110 may also provide various session management functions associated with the services instantiated by or on behalf of various subscribers/customers of the service provider. Session management functions generally include sending data to CPE such as commands, encryption keys and the like, receiving data from CPE such as information stream requests, session initiation data (set-top identification, authorization information etc.), user interaction information and the like.

Each of the nodes 130 is adapted to communicate with a respective group of subscribers/customers via respective CPE located at the subscriber/customer house or premises. Subscriber/customer CPE may comprise, illustratively, network interface devices 140, wireless routers 150, wired set-top boxes (STBs) 160, wireless STBs 170 and the like. Other types of CPE may also be utilized as will be appreciated by those skilled in the art.

Referring to FIG. 1, node 130-2 is depicted as communicating with a group of network interface devices (NIDs) 140-1 through 140-N (collectively network interface devices 140). However, in various embodiments where the NID 140 is not necessary to connect the node 130 and subscriber/customer CPE, the node 130 and subscriber/customer CPE is connected directly or via some other interface mechanism.

The authentication manager 120 comprises a management entity adapted to implement various CPE authorization mechanisms as discussed herein with respect to the various embodiments. The authentication manager 120 may be implemented as a standalone entity interacting with CPE via the head end 110, via a node 130 or via some other network entity in direct or indirect communication with CPE to be authorized. In various embodiments, the authentication manager 120 is included as a module or element within the head end 110 and/or node 130. The authentication manager 120 may be implemented within, or interact with, one or more of the nodes 130 to provide a CPE authorization mechanism for respective groups of subscribers/customers.

In various embodiments, the authentication manager 120 and/or some of the functions described herein with respect to the authentication manager 120 are not used. For example, in various embodiments all CPE authentication is performed locally by, illustratively, a local wireless router associated with or part of the CPE. In these embodiments, any services provided via the local wireless router early provided to CPE directly and/or autonomously authenticated by the local wireless router or other local CPA. In this manner, the policing/authentication of CPE is implemented directly at the point at which unauthorized services are often stolen; namely, the local wireless router or other local CPE. Thus, the various embodiments described herein further contemplate a local CPE and/or local wireless router CPE authentication functionality operating independently of a centralized network authentication manager 120.

FIG. 1 depicts CPE at a first location (LOCATION 1) such as a house or business address, and a SECOND LOCATION (LOCATION 2) such as a neighboring house or business address. In particular, the first location is depicted as including second NID 140-2, wireless router 150, wired STB 160, wireless STB 170 and wireless television 190, while the second location is depicted as including unauthorized STB 170' and unauthorized wireless television 190'.

The wired STB 160 comprises, illustrated, a MVPD STB or terminal connected to the NID 140-2 or network node 130-2 via, illustratively, a coaxial cable, optical cable or hybrid fiber-coax cable connection or signal path denoted as C1. The STB 160 may receive video content and the like, electronic program guides and so on to provide television services such as adapted for display upon a presentation device (not shown).

The wireless router 150 comprises, illustratively, a routing or switching device connected to the NID 140-2 or network node 130-2 via the connection or signal path denoted as C1. The wireless router 150 includes various radio transceivers (not shown) operative to wirelessly route data to and from other wireless devices, such as those adhering to one or more of the various Wi-Fi standards channels, such as via 802.11x network 180 (where x=a, b, n, g, ac or any other indicator of a particular Wi-Fi protocol or revision thereof).

The wireless STBs 170/170' and wireless televisions 190/190' perform similar functions to that described above with respect to STB 160, except that wireless STBs 170/170' and wireless televisions 190/190' communicate/interact with head end 110 via channels that traverse the Wi-Fi network 180.

The wireless STB 170 and wireless television 190 are authorized to use the services provided via the Wi-Fi network 180 since this CPE is authorized for use by the subscriber/customer associated with the first location.

The wireless STB 170' and wireless television 190' are not authorized to use the services provided via Wi-Fi network 180 since this CPE is only authorized for use by the subscriber/customer associated with the first location and these devices are in possession of an unauthorized user at a second location.

Another situation contemplated by the various embodiments is where, illustratively, wireless STB 170', or wireless television 190', or other wireless CPE at the second location is authorized for use at that second location but receiving services via the Wi-Fi network 180 of the first location. This may occur inadvertently or it may occur purposely. In either case, the result is the same; namely, services authorized for use at the first location are being consumed at a second location. The various embodiments address this problem by avoiding the delivery of services to unauthorized CPE at the second location.

It is noted that the wireless router 150, wired STB 160, wireless STB 170 and wireless television 190 at the first location are powered by AC power available at the first location; namely, AC power delivered via the AC power signal path denoted as AC-1. Similarly, the wireless STB 170' and wireless television 190' at the second location are powered by AC power available at the second location; namely, AC power delivered via the AC power signal path denoted as AC-2. For example, if the first and second locations represented neighboring homes, each of the neighboring homes would be associated with its own AC power source and, therefore, a different AC power signal path.

Generally speaking, various embodiments implement a mechanism to periodically authenticate CPE in a manner requiring use of location-specific infrastructure, such as customer premises (e.g., home or office) wiring or cabling associated with AC power distribution, cable-television distribution, telephone distribution, computer networking and the like. Generally speaking, any infrastructure capable of functioning as a medium for conveying signals within a home, business or other dwelling may be adapted for use within the context of the various embodiments to provide a wired or line of sight wireless connection or signal path C1.

Wireless router 150 is depicted as including an AC data receiver 155. Specifically, AC data receiver 155 is operably coupled to the AC power signal path used to supply power to the wireless router 150 (i.e., AC-1) to receive data therefrom. In various embodiments, AC data receiver 155 may also transmit data via the AC power signal path.

Wireless STBs 170/170' and wireless televisions 190/190' are depicted as including, respectively, AC transmitters 175 and 195. Specifically, each of the AC data transmitters 175 is operably coupled to the AC power signal path used to supply power to its respective wireless STB 170/170' to transmit data thereto. Similarly, each of the AC data transmitters 195 is operably coupled to the AC power signal path used to supply power to its respective wireless television 190/190' to transmit data thereto. In various embodiments, one or more of the AC data transmitters 175/195 may also receive data from the AC power signal path to which it is connected.

As previous noted, multiple theft of service situations exist in which an authorized user enables theft of services by, for example, providing an extra wireless STB or wireless television to a neighbor. That is, a home user may have a service account associated with an authenticated local CPE (e.g., a wireless STB within the home) and an unauthenticated CPE (e.g., a wireless STB in the home of a neighbor), where both CPE access network services via a wireless router within the home of the user. Various embodiments are adapted to identify this type of theft and take corrective/protective action.

In various embodiments, an authentication protocol is implemented wherein the wireless router 150 transmits an authentication trigger signal (e.g., a "challenge" message) via the wireless network 180 to each of the wireless STBs 170/170' and wireless televisions 190/190'. Each of the wireless STBs 170/170' and wireless televisions 190/190' receiving the authentication trigger signal via the wireless network 180 responsively transmits an authentication trigger response signal (e.g., an "acknowledgment" message) to the wireless router 150 (or other network element or CPE) via its respective power signal path AC (e.g., AC-1 or AC-2). The acknowledgment message is then processed by the wireless router 150 (or other network element or CPE) to authenticate those wireless devices within the appropriate location as determined by an ability to transmit the acknowledgment message using the AC power signal path associated with the location.

Thus, if wireless router 150 transmits an authentication trigger signal, responses will only be received from the wireless STB 170 and wireless television 190 at the first location since only these devices are able to communicate via the power signal path AC-1 at the first location. Thus, only these devices will be authenticated as authorized CPE with respect to the first location. By contrast, wireless STB 170' and wireless television 190' at the second location cannot provide an authentication response signal via power signal path AC-1. Therefore, these devices will not be authenticated and are not authorized CPE with respect to the first location.

In various embodiments, sessions associated with non-authenticated and/or not authorized CPE are terminated or degraded by any network elements communicating therewith, such as the corresponding wireless router 150, NID 140, node 130, head end 110, authentication manager 120 (wherever implemented) and/or any appropriate session management entity.

In various embodiments, the authentication manager 120 is included within or cooperates with the head end 110 to provide a global or systemwide mechanism for managing wireless CPE authentication by sequentially, selectively and/or randomly invoking an authentication protocol at some or all of the locations serviced by the head end 110.

In various embodiments, the authentication manager 120 is included within or cooperates with an individual node 130 to provide a neighborhood or node wide mechanism for managing wireless CPE authentication by sequentially, selectively and/or randomly invoking an authentication protocol at some or all of the locations serviced by the nodes 130. Each of the nodes 130 may be associated with a respective authentication manager 120. Groups of nodes 130 may be associated with a common authentication manager.

In various embodiments, the authentication manager 120 is included within or cooperates with an individual wireless router 150 to provide a localized mechanism for managing wireless CPE authentication by sequentially, selectively and/or randomly invoking an authentication protocol for some or all of the wireless CPE at a specific location.

In various embodiments, the authentication manager 120 is not used; rather, individual wireless routers 150 periodically invoke an authentication protocol to identify wireless CPE having the same location as the wireless router.

In various embodiments, the wireless router 150 may operate or be caused to terminate or degrade sessions associated with wireless CPE at different locations or otherwise unauthorized. For example, in various embodiments the wireless router 150 periodically authenticates any wireless CPE in communication with the wireless router 150 and terminates service (or perform some other process) in response to identifying unauthenticated wireless CPE. In various embodiments, information pertaining to CPE identified as local with respect to the wireless router 150 may be propagated toward the head end 110 or other session management entity such that sessions associated with non-authorized wireless CPE may be terminated or degraded.

The various embodiments depicted herein utilize location-specific infrastructure, such as customer premises AC power wiring, cable-television wiring, telephone wiring, computer network wiring, wireless line of sight (such as infrared) and the like. In various embodiments, the location-specific infrastructure comprises a sound transmissive infrastructure element and/or an optical transmissive infrastructure element.

In the case of a sound/optical transmissive infrastructure element elements, free space sound or light transmission such as within the location may be used to convey the authentication challenge signal and/or authentication acknowledgment signal.

For example, in the case of a sound transmissive infrastructure element, an audible or inaudible sound may be used to provide an authentication challenge signal and/or an authentication acknowledgment signal. Similarly, in the case of an optical transmissive infrastructure element, a visible or invisible beam of light (generally speaking, a line of sight RF signal) may be used to provide an authentication challenge signal and/or an authentication acknowledgment signal. The sound or line of sight RF signal may be modulated to convey data according to any known technique (e.g., pulse code modulation, Manchester coding and the like), may be triggered in a particular manner (e.g., a predefined number of bursts/pulses, a predefined spacing between bursts/pulses and the like) and so on.

Other relatively short range signals may also be used to convey the authentication challenge signal and/or authentication acknowledgment signal, such as Bluetooth signals or other short range RF signals and the like.

Considering an audio signal example, in response to an authentication challenge signal transmitted to potentially unauthorized CPE via a Wi-Fi network delivering services, the potentially unauthorized CPE emit an audible or inaudible audio signal which is received by appropriate local CPE (e.g., microphone input, A/V input and the like of a television, STB or other local CPE). This embodiment requires close proximity of local CPE to a local wireless router or other service providing local CPE, such as in a small house, apartment and the like.

Within the context of the embodiments discussed above with respect to FIG. 1, the exemplary infrastructure comprises home/office AC power wiring. AC data transmitter 175 modulates or otherwise transmits data upon the AC power wiring using any of a plurality of known techniques. Similarly, AC data receiver 155 the modulates or otherwise receives data from the AC power wiring using any of the plurality of known techniques. The actual data may comprise data according to any format capable of providing the challenge/response messaging discussed herein. A first single byte, bit pattern or message may be used to represent a challenge message, while a second single byte, bit pattern or message may be used to represent a challenge response message.

The actual construction of the AC data transmitter 175 and AC data receiver 155 is known to those skilled in the art and will not be discussed in more detail herein. Generally speaking, the AC data transmitter 175 and AC data receiver 155 may be implemented using any of a plurality of known techniques, such as long-haul/low-frequency techniques, low/medium speed frequency techniques (e.g., 100 kHz), high frequency techniques, home networking techniques, broadband over powerline techniques and so on. Various standards bodies including the Institute for Electrical and Electronic Engineers (IEEE) have promulgated various standards in this area (e.g., IEEE standard 1901-2010). Other industry groups such as the HomePlug Powerline Alliance have also provided standards in this area. Any of these techniques may be used within the context of various embodiments.

In various other embodiments, where other types of infrastructure are used such as cable television wiring, telephone wiring, computer network wiring and the like, the implementation/construction of the AC data transmitter 175 and AC data receiver 155 are adapted to, respectively, transmit and receive data via this other type of infrastructure.

The various embodiments discussed herein generally contemplate a mechanism for authenticating service consuming CPE location by transmitting an authentication trigger signal via a Wi-Fi network, wireless data link (e.g., Bluetooth) or other wireless means and receiving an appropriate response via local infrastructure supported communication mechanism.

In various other embodiments, the local infrastructure support medication means is used to transmit the authentication trigger signal, while the appropriate response is received via the same or different local infrastructure, a Wi-Fi network, a wireless data link or other communication mechanism. Thus, in these embodiments, the various functions described herein with respect to the various figures are modified in that authentication trigger signals are transmitted via local infrastructure means, while authentication trigger response signals are received via local infrastructure means and/or local Wi-Fi or wireless data to medication means.

Thus, the various embodiments contemplate a mechanism for authenticating service consuming CPE location by transmitting a authentication trigger signal via a first communication mechanism and receiving an appropriate response via a second communication mechanism, where at least one of the communication mechanism comprises a local infrastructure supported communication mechanism.

Figure 2:
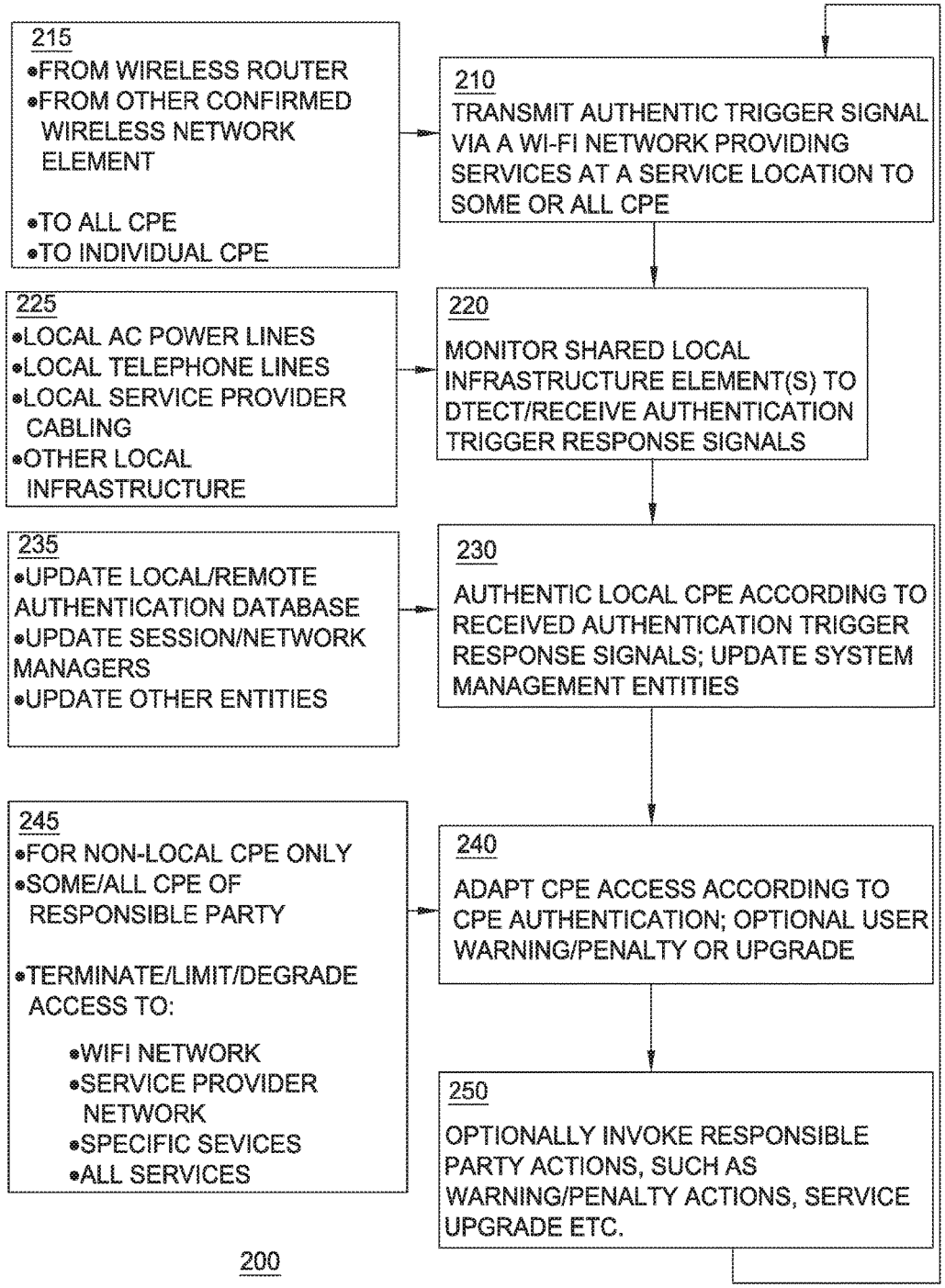
FIGS. 2 and 3 depict a flow diagrams of methods according to various embodiments.

FIG. 2 depicts a flow diagram of a method according to various embodiments. Specifically, FIG. 2 depicts a flow diagram of location-based wireless CPE authentication method or protocol adapted to ensure that wireless CPE utilizing a location specific Wi-Fi network to access services conform to location requirements associated with such access.

At step 210, an authentication trigger signal is transmitted via a first communication mechanism, illustratively a Wi-Fi network providing services at a service location, toward some or all of the CPEs accessing services via the Wi-Fi network. Referring to box 215, the authentication trigger signal (e.g., CHALLENGE) may be transmitted via a wireless router or other confirmed wireless network element associated with the Wi-Fi network. A confirmed wireless network element may comprise a wireless network element confirmed to be sharing local infrastructure with a service provider network interface device (NID), the particular wireless router supporting the Wi-Fi network and the like. Shared local infrastructure may comprise shared AC power, shared service provider wiring/cabling and the like. The authentication trigger signal may be transmitted to all CPE associated with the service location or individual CPE associated with the service location (e.g., CPE suspected of use for theft of services).

In various embodiments, the confirmed wireless network element may transmit the authentication trigger signal via means other than a local Wi-Fi network, such as via Bluetooth or other RF means. In various embodiments, the first communication mechanism may comprise a local infrastructure supported communication mechanism.

At step 220, a second communication mechanism, illustratively one or more shared local infrastructure elements, are monitored to detect/receive authentication trigger response signals (e.g., ACKNOWLEDGMENT) from any CPE utilizing the Wi-Fi network. Referring to box 225, the monitored local infrastructure may comprise one or more of local (to a business or home) wiring/cabling such as supporting AC power distribution, cable-television distribution, telephone service distribution, computer networking and/or other local infrastructure.

In various embodiments, the second communication mechanism may comprise a local Wi-Fi network, a Bluetooth or other RF data to medication means and the like. Generally speaking, at least one of the first communication mechanism discussed at step 210 and the second communication mechanism discussed at step 220 comprise a local infrastructure supported communication mechanism.

At step 230, local CPE is authenticated according to received authentication trigger response signals. Optionally, system management entities are updated. That is, CPE providing an authentication trigger response signal via the appropriate local infrastructure authenticated as local, while CPE failing to provide an authentication trigger response signal via the appropriate local infrastructure are deemed to be non-local and therefore unauthenticated. Referring to box 235, system management entities to be updated may comprise local or remote authentication databases, session managers, network managers and/or other entities.

At step 240, CPE access is adapted according to CPE authentication. Referring to box 245, CPE adaptation may be applied only to non-local CPE (i.e., an authenticated CPE), some CPE associated with the responsible party or all CPE associated with the responsible party. CPE adaptation may comprise terminating, limiting and/or degrading CPE access to the Wi-Fi network itself, the service provider network, specific services provided by the service provider, all services provided by the service provider and so on. CPE adaptation may also comprise higher level more intensive levels of challenges (such as request to enter a password on the screen).

At step 250, responsible party actions are optionally invoked, such as warning actions, penalty actions, service upgrade actions and the like. For example, a subscriber/customer sharing services in an unauthorized manner with a neighbor may be warned to stop such activities, to pay a penalty for such activities, pay for the actual services stolen and so on. Further, the subscriber/customer may be provided with a service upgrade opportunity to enable authorized sharing of various services if such authorization is available from the service provider. For example, in the case of family members sharing a multifamily dwelling where the service provider offers discounted service to geographically proximate family members.

The various steps forming the method 200 may be repeated according to a predefined schedule or other parameters, such as discussed below with respect to a authentication profile. For example, a network element performing wireless CPE authentication as described herein may perform such authentication autonomously (e.g., according to an authentication schedule or in response to an operational or status condition) and/or in response to a command received from an local or remote authentication manager or other network management element. In various embodiments, a local or remote authentication database is updated after each invocation of a wireless CPE authentication routine or procedure.

Figure 3:
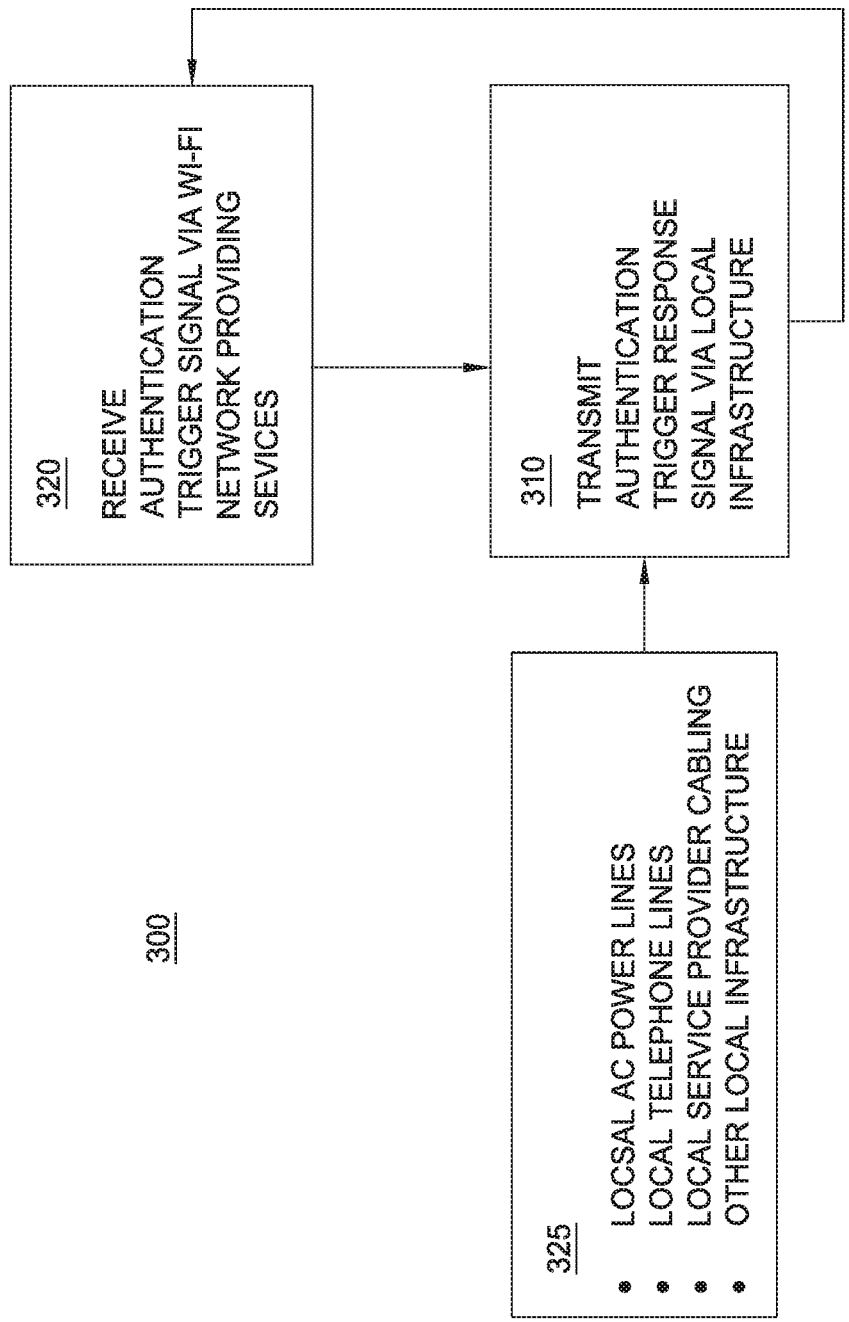

FIG. 3 depicts a flow diagram of a method according to various embodiments. Specifically, FIG. 3 depicts a flow diagram of wireless CPE authentication response method 300 appropriate for use by wireless CPE accessing services via a Wi-Fi network as discussed herein.

At step 310, the wireless CPE receives an authentication trigger signal via the Wi-Fi network providing services. For example, each wireless CPE associated with a location may receive a individual or group authentication trigger signal via the Wi-Fi network as discussed herein.

At step 320, the CPE transmits an authentication trigger response signal via a local infrastructure. Referring to box 325, the authentication trigger response signal (e.g., ACKNOWLEDGE) may be transmitted via local infrastructure such as customer premises electrical wiring, customer premises cable-television wiring, customer premises telephone wiring and/or customer premises computer network cabling. The authentication trigger response signal may be transmitted to all local network elements, or a specific network element (e.g., a wireless router).

The various steps forming the method 300 are repeated as necessary.

Thus, the various embodiments discussed herein with respect to the various systems, methods, mechanisms and so on are well suited to combating both innocent theft of services situations as well as those theft of service situations facilitated by a subscriber/customer of a service provider.

The authentication protocol 200 of FIG. 2 may be implemented using, illustratively, a wireless router or other local wireless networking device. In various embodiments, the operational parameters associated with the authentication protocol may be default parameters or may be defined by a management entity associated with the service provider, such as the authentication manager 120 discussed above with respect to FIG. 1.

In various embodiments, operational parameters may be included within a location authentication profile generated by the authentication manager 120 or some other management entity. The authentication profile is utilized by one or more network element to invoke or execute the authentication protocol at appropriate locations. For example, the authentication profile may be utilized at head end 110, node 130, NID 140, wireless router 150 or other some other network element to cause the authentication protocol to be invoked or executed by service provider network elements at one or more locations reachable by the network element utilizing an authentication profile.

Operational parameters associated with the authentication protocol may comprise any parameter relevant to the service provider. A partial list of parameters associated with authentication protocol operation or frequency of execution may include:

(1) temporal parameters adapted to cause authentication protocol execution at particular times, at particular frequencies or rates and so on, such as at specific times of the day, every 10 minutes, once per hour, once per day and so on;

(2) session parameters adapted to cause authentication protocol execution in response to specific session-related conditions, such as upon establishment of any session, establishment of a high-bandwidth session, establishment of a session associated with a specific service, reaching some session-based threshold (e.g., bandwidth consumption, session duration and the like above a threshold level) and other session-based metrics;

(3) CPE activities which, when detected, trigger execution of the authentication protocol such as CPE power up, power cycling, software/firmware update, poor CPE wireless network performance and the like; and/or (4) subscriber/customer parameters which, when detected, trigger execution of the authentication protocol such as service level agreement (SLA) changes or updates, subscriber interaction or session activity inconsistent with prior interaction or session activity (e.g., requested service/content outside of normal or defined boundaries, content ratings and the like) and other user-based conditions.

Figure 4:
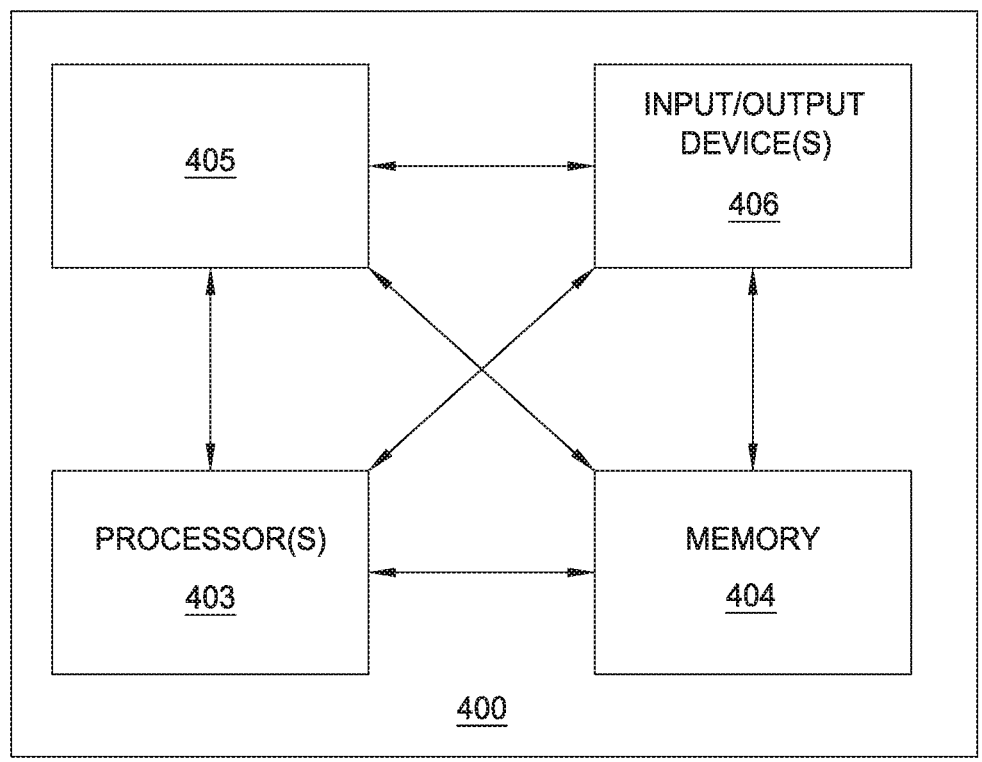
FIG. 4 depicts a high-level block diagram of a computer suitable for use in performing the functions described herein.

FIG. 4 depicts a high-level block diagram of a computing device, such as a processor in a telecom network element, suitable for use in performing functions described herein such as those associated with the various elements described herein with respect to the figures.

As depicted in FIG. 4, computing device 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computing device 400 depicted in FIG. 4 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A system for authenticating wireless customer premises equipment (CPE), the system including a network element comprising a non-transitory computer readable medium storing instructions for configuring a processor for authenticating wireless customer premises equipment (CPE), the processor configured for:
   causing transmission, by a confirmed wireless network element at a service location, an authentication trigger signal via a first communication mechanism at the service location toward wireless CPE proximate the service location;
   detecting an authentication trigger response signal, by a confirmed network element at the service location monitoring a second communication mechanism at the service location; and
   authenticating only wireless CPE associated with a detected authentication trigger response signal;
   wherein at least one of said first and second communication mechanisms comprises a local infrastructure supported non-wireless communications mechanism.

2. The system of claim 1, wherein the network element comprises a network interface device (NID) configured to support communications between service provider equipment and the confirmed wireless network element at the service location.

3. The system of claim 2, wherein the confirmed wireless network element comprises a wireless router at the service location.

4. The system of claim 1, wherein the confirmed network element at the service location monitoring a second communication mechanism at the service location comprises one of the confirmed wireless network element and a confirmed non-wireless network element.

5. The system of claim 1, wherein said processor is configured to perform the causing transmission, detecting and authenticating according to at least one of an authentication schedule and a command received from an authentication manager.

6. The system of claim 1, wherein the network element comprises an authentication manager associated with a service provider head end and configured to communicate with wireless CPE at the service location.

7. The system of claim 6, wherein the authentication manager is configured to communicate with a plurality of service locations associated with the head end.

8. The system of claim 7, wherein the causing transmission, detecting and authenticating are performed for each of said plurality of service locations in response to a respective authentication profile.

9. The system of claim 8, wherein each authentication profile provides one or more parameters adapted to modify authentication protocol operation or frequency of execution.

10. The system of claim 9, wherein said parameters comprise one or more of temporal parameters, session parameters, CPE activity parameters and subscriber parameters.

11. The system of claim 1, wherein said local infrastructure comprises customer premises electrical wiring.

12. The system of claim 1, wherein said local infrastructure comprises customer premises cable-television wiring.

13. The system of claim 1, wherein said local infrastructure comprises one of customer premises telephone wiring and customer premises computer network cabling.

14. The system of claim 1, wherein said local infrastructure comprises a sound transmissive infrastructure element.

15. The system of claim 1, wherein said local infrastructure comprises an optical transmissive infrastructure element.

16. The system of claim 1, wherein said authentication trigger signal is transmitted to each CPE associated with the service location.

17. The system of claim 1, wherein the processor is further configured for adapting a service provided to CPE in response to a failure to detect an authentication trigger response signal from the CPE, said adapting comprising one or more of reducing access to a service provider network, reducing access to a specific service provided via said service provider network, reducing access to a group of services provided via said service provider network, terminating access to a service provider network, terminating access to a specific service provided via said service provider network, terminating access to a group of services provided via said service provider network, degrading access to a service provider network, degrading access to a specific service provided via said service provider network and degrading access to a group of services provided via said service provider network.

18. The system of claim 1, wherein the processor is further configured for invoking a responsible party action in response to a failure to detect an authentication trigger response signal from the CPE, said responsible party action comprising one or more of a warning, a penalty and a service upgrade opportunity.

19. A method for authenticating wireless customer premises equipment (CPE) at a service location, the method comprising:
   causing transmission, by a confirmed wireless network element at the service location, an authentication trigger signal via a first communication mechanism at the service location toward wireless CPE proximate the service location;
   detecting an authentication trigger response signal, by a confirmed network element at the service location monitoring a second communication mechanism at the service location; and
   authenticating only wireless CPE associated with a detected authentication trigger response signal;
   wherein at least one of said first and second communication mechanisms comprises a local infrastructure supported non-wireless communications mechanism.

20. A tangible and non-transient computer readable storage medium storing instructions which, when executed by a computer, adapt the operation of the computer to provide a method of authenticating wireless customer premises equipment (CPE) at a service location, the method comprising:

causing transmission, by a confirmed wireless network element at the service location, an authentication trigger signal via a first communication mechanism at the service location toward wireless CPE proximate the service location;

detecting an authentication trigger response signal, by a confirmed network element at the service location monitoring a second communication mechanism at the service location; and authenticating only wireless CPE associated with a detected authentication trigger response signal;

wherein at least one of said first and second communication mechanisms comprises a local infrastructure supported non-wireless communications mechanism.

* * * * *